United States Patent [19]

Bunse

[11] Patent Number: 5,654,815
[45] Date of Patent: Aug. 5, 1997

[54] SYNCHRONIZATION METHOD AS WELL AS SYNCHRONIZING UNITS, TERMINAL AND EXCHANGE THEREFOR

[75] Inventor: Stephan Bunse, Stuttgart, Germany

[73] Assignee: Alcatel N.V., Netherlands

[21] Appl. No.: 440,822

[22] Filed: May 15, 1995

[30] Foreign Application Priority Data

May 21, 1994 [DE] Germany .................. 44 17 954.5

[51] Int. Cl.$^6$ ................................. H04B 10/00
[52] U.S. Cl. .................. 359/158; 359/135; 370/503; 375/356
[58] Field of Search .................. 359/110, 135, 359/158, 152, 162; 370/103, 503; 375/356, 357, 358; 327/146; 455/51.1

[56] References Cited

U.S. PATENT DOCUMENTS

| | | | |
|---|---|---|---|
| 4,409,684 | 10/1983 | Pooch et al. | 370/106 |
| 4,563,774 | 1/1986 | Gloge | 455/607 |
| 5,059,926 | 10/1991 | Karczewski | 331/47 |
| 5,361,398 | 11/1994 | Christian et al. | 455/57.2 |
| 5,444,710 | 8/1995 | Fisher et al. | 370/103 |

FOREIGN PATENT DOCUMENTS

| | | | |
|---|---|---|---|
| 0141194 | 5/1985 | European Pat. Off. | H04L 7/04 |
| 0425470 | 5/1991 | European Pat. Off. | H04J 3/06 |
| 3029105 | 2/1981 | Germany | H04B 9/00 |
| 3325569 | 2/1984 | Germany | H04L 5/00 |
| 3412986 | 10/1985 | Germany | H04J 13/00 |
| 3843633 | 7/1990 | Germany | H03L 7/00 |
| 3943052 | 7/1991 | Germany | H04Q 3/47 |
| 3501670 | 7/1992 | Germany | H03M 7/14 |
| 4107640 | 9/1992 | Germany | H04L 7/04 |
| 1681393 | 4/1989 | U.S.S.R. | H04B 10/06 |
| 1795472 | 2/1993 | U.S.S.R. | G06F 15/332 |
| 1577331 | 10/1980 | United Kingdom | H04J 3/06 |
| 9115907 | 10/1991 | WIPO | H04L 7/04 |

OTHER PUBLICATIONS

K. Kiasaleh, et al., "Time and Frequency Transfer Between Master and Slave Clocks", IEEE Transactions on Communications, vol. 38, No. 10, (Oct. 1990), pp. 1900–1912.
Sklar, B., "Digital Communications, Fundamentals and Applications", Prentice Hall, Englewood Cliffs, NJ, (1988), pp. 429–471.
W. Ernst, "Digitalsignale im richtigen Takt", Telecom Report 12 (1989), vol. 5, pp. 150–153.
K. Kiasaleh, et al, "Time and Frequency Transfer Between Master and Slave Clocks" IEEE Transactions on Communications, vol. 38, No. 10, (Oct. 1990), 1900–1912.
Sklar, B., "Digital Communications, Fundamentals and Applications", Prentice Hall, Englewood Cliffs NJ 1988, pp. 429–471.
"Digitalsignale im richtigen Takt", W. Ernst, Telecom Report 12 (1989), vol. 5, pp. 150–153.

*Primary Examiner*—Kinfe-Michael Negash
*Attorney, Agent, or Firm*—Ware, Fressola, Van Der Sluys & Adolphson LLP

[57] ABSTRACT

Rather than synchronizing clocks between two stations in an optical communication system by correlating a received synchronization signal with an own-station synchronization signal and controlling the own-station clock accordingly, the correlation takes place in one station (EX), but the correlation product is evaluated in the other station (E1–E3), and the clock signal of the latter is controlled accordingly. This may be done by sending a first synchronization bit sequence from a terminal (E1–E3) and looping it back in an exchange (EX) at the bit rate of a second synchronization bit sequence, wherein the clock generator of the terminal (E1–E3) is controlled according to the received correlation bit sequence. This has the advantage at the exchange that synchronization requires only optical switches and no optical-to-electrical transducers. It permits all optical exchanges and eliminates one optical-to-electrical transducer per connected subscriber. The only disadvantage is that for a transmitter without receiver, an additional reverse channel is necessary.

7 Claims, 3 Drawing Sheets

5,654,815

SYNCHRONIZATION METHOD AS WELL AS SYNCHRONIZING UNITS, TERMINAL AND EXCHANGE THEREFOR

TECHNICAL FIELD

The present invention relates to optical communication systems and, more particularly, to synchronization between stations in such a system.

BACKGROUND OF THE INVENTION

Fiber-optic data transmission generally imposes new requirements on clock synchronization. It is desirable to accomplish clock synchronization by optical means and dispense with optical-to-electrical transducers.

The invention starts from a synchronizing unit as is described, for example, in PCT Application WO 91/15907. This PCT application describes a transmission system which comprises a transmitting unit and a plurality of access nodes and in which the clocks of the access nodes are to be synchronized with the clock of the transmitting unit. The transmitting unit is connected to the access nodes by an optical fiber and transmits a bit sequence as a synchronization signal to the access nodes. In the access nodes, this synchronization signal is coupled from the fiber and fed to a synchronizing unit.

This prior art synchronizing unit contains an electrically controllable optical switching element, an optical-to-electrical transducer, a clock generator, a sequence generator, an integrator, and a controller.

The sequence generator generates a bit sequence at the clock rate of the clock generator. By means of the switching element, this bit sequence is correlated with the bit sequence extracted from the fiber, which serves as the synchronization signal. The transducer converts the resulting optical signal to an electric signal, which is integrated in the integrator, and the result of the integration is fed to the controller. By means of this result, the controller determines the offset between the clock generator and the clock signal on the fiber, and it controls the clock generator so that this clock difference disappears, i.e., that the clock generator is in lock with the clock signal on the fiber.

The disadvantage of this synchronization method is that it only represents a specific solution for a distributed switching system. It only permits clock synchronization for the transmission of data packets from a clocking station to one or more clock-synchronous stations. Thus, the method is not suitable for the transmission of data packets from terminals to a central exchange at the clock rate of the exchange, for example.

DISCLOSURE OF INVENTION

It is the object of the invention to synchronize the clock of a first, clocking station with the clock of a second, clock-synchronous station.

The basic idea of the invention is that the correlation of the synchronization signals takes place in the clocking station, whereas the resulting correlation signal is not evaluated in this station but is transmitted to the clock-synchronous station, where the clock of the latter is then adjusted by means of the result of the evaluation.

According to the first aspect of the invention, a method of synchronizing at least a first clock signal of a first station with at least a second clock signal of a second station, comprising the steps of sending a first synchronization signal containing the first clock signal from the first station to the second station and correlating the first synchronization signal in the second station with a second synchronization signal containing the second clock signal to obtain a correlation signal, is characterized in that the correlation signal is sent from the second station back to the first station in response to the transmission of the first synchronization signal, that the correlation signal is evaluated in the first station, and that the result of said evaluation is used to adjust the first clock signal of the first station.

In further accord with the first aspect of the invention, the method is further characterized in that the first and second synchronization signals are formed by a first synchronization bit sequence and second synchronization bit sequence, respectively, and that the two synchronization bit sequences are correlated by passing the first synchronization bit sequence through a switching device controlled by the second synchronization bit sequence, said switching device generating a correlation bit sequence and sending it back to the first station.

In still further accord with the first aspect of the invention, the method is further characterized in that a first bit- and frame-rate clock of the first station is synchronized with a second bit- and frame-rate clock of the second station.

Still further in accord with the first aspect of the invention, the method is further characterized in that the first station sends a first sequence of data packets to the second station at the first bit clock rate and at the first frame clock rate, and that the first synchronization bit sequence is sent from the first station to the second station between the first data packets.

Further still in accord with the first aspect of the invention, the method is further characterized in that the second station sends second data packets to the first station, and that the correlation bit sequence is delayed by a constant time interval which is chosen so that when the clock signals are in synchronism, the correlation bit sequence is sent from the second station to the first station between the second data packets.

According to a second aspect of the invention, a synchronizing unit for a first station, for synchronizing at least a first clock signal of the first station with at least a second clock signal of a second station, comprising a generator for generating a first synchronization signal containing the first clock signal and a transmitting device for transmitting the first synchronization signal to the second station, is characterized in that the synchronizing unit is provided with a receiving device for receiving a correlation signal from the second station, with an evaluating device, and with a controller, that the evaluating device is adapted to determine from the correlation signal the offset between the first and second clock signals, and that the controller is adapted to adjust the first clock signal by means of a clock offset determined by the evaluating device.

According to a third aspect of the invention, a synchronizing unit for a second station, for synchronizing at least a first clock signal of a first station with at least a second clock signal of the second station, comprising a generator for generating a second synchronization signal containing the second clock signal and a correlator for correlating the second synchronization signal with a first synchronization signal containing the first clock signal, is characterized in that the synchronizing unit is provided with a transmitting device which is adapted to receive from the correlator a correlation signal corresponding to the result of the correlation of the first and second synchronization signals, and to transmit said correlation signal to the first station.

In further accord with the third aspect of the invention, the synchronizing unit is further characterized in that the first synchronization signal and the correlation signal are optical signals, and that the correlator and the transmitting device each contain an optical switch controlled by the second synchronization signal.

According to a fourth aspect of the invention, a terminal for connection to an exchange, comprising a synchronizing unit for synchronizing at least a first clock signal of the terminal with at least a second clock signal of the exchange, is characterized in that the synchronizing unit is provided with a generator for generating a first synchronization signal containing the first clock signal, with a transmitting device for transmitting a first synchronization signal to the exchange, with a receiving device for receiving a correlation signal from the exchange, with an evaluating device, and with a controller, that the evaluating device is adapted to determine from the correlation signal the clock offset between the first and second clock signals, and that the controller is adapted to adjust the first clock signal by means of the clock offset determined by the evaluating device.

According to a fifth aspect of the invention, an exchange comprising a synchronizing unit for synchronizing at least a first clock signal of at least one terminal with at least a second clock signal of the exchange, is characterized in that the synchronizing unit is provided with a generator for generating a second synchronization signal containing the second clock signal, with at least one correlator for correlating a first synchronization signal containing the first clock signal with the second synchronization signal, and with at least one transmitting device, and that the transmitting device is adapted to receive from the associated correlator a correlation signal corresponding to the result of the correlation of the first and second synchronization signals, and to transmit said correlation signal to the terminal.

The invention has the advantage that only optical switches and no optical-to-electrical transducers are required in the clocking station, i.e., that clock synchronization can be achieved there by all-optical means. Thus, in a communications system comprising a plurality of clock-synchronous terminals and a clocking exchange, no optical-to-electrical transducers are required at the exchange to synchronize the terminals with the clock of the exchange. Since, by the invention, the terminals are synchronized with the clock of the exchange, it is not necessary to provide any buffers at the exchange for clock synchronization. Such buffers are difficult or impossible to implement by optical means. It is thus possible to construct an all-optical exchange.

In an optical transmission system, the received optical data must be converted to electrical form in the terminal, so that the correlation signal is already available in electrical form. Thus, in the terminal, no additional optical-to-electrical transducer is required for the correlation signal, so that one optical-to-electrical transducer per connected terminal is saved.

These and other objects, features and advantages of the present invention will become more apparent in light of the detailed description of a best mode embodiment thereof, as illustrated in the accompanying drawing.

BEST MODE FOR CARRYING OUT THE INVENTION

The embodiment explains the use of the method according to the invention in a communications system comprising two or more terminals according to the invention and an exchange according to the invention, each of the terminals and the exchange including a synchronizing unit according to the invention.

It is also possible to apply the invention to another communications systems with two or more stations provided that one of the stations is the clocking station and is connected to the other stations via bidirectional data paths.

Figure 1:
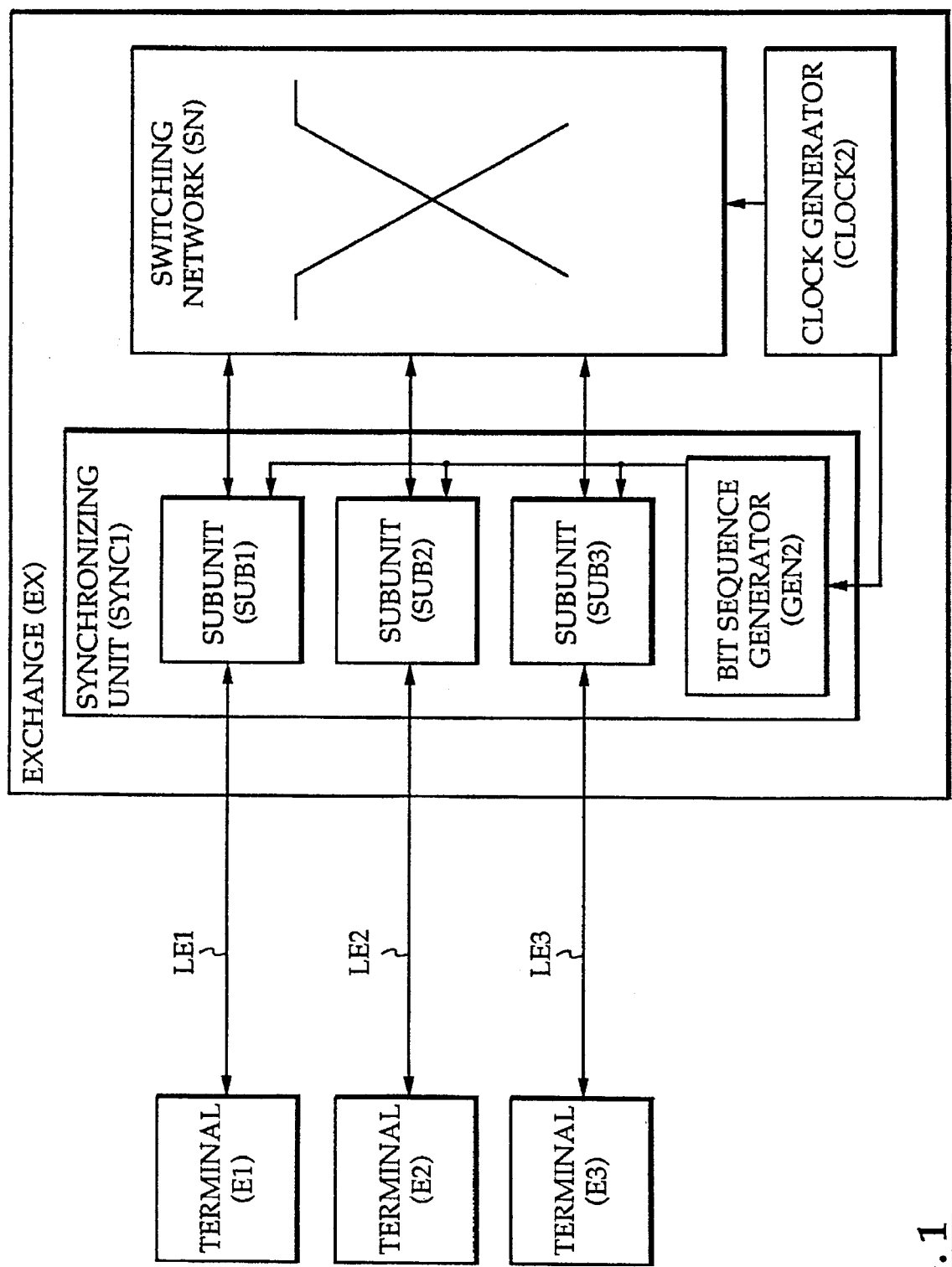
FIG. 1 shows several terminals according to the invention and an exchange according to the invention.

FIG. 1 shows three terminals E1 to E3 and an exchange EX. The exchange EX is connected to the terminals E1 to E3 by bidirectional links LE1, LE2, and LE3, respectively.

The exchange EX contains a clock generator CLOCK2, a switching network SN, and a synchronizing unit SYNC2 with a bit sequence generator GEN2 and three synchronizing subunits SUB1 to SUB3. The synchronizing subunits SUB1 to SUB3 are connected to the bit sequence generator GEN2, to the switching network SN, and to the links LE1, LE2, and LE3, respectively. The clock generator CLOCK2 is connected to the switching network SN and to the bit sequence generator GEN2.

The terminals E1 to E3 are arbitrary communications terminals, such as terminals for voice, data, or video communication. Each of them has an optical input/output for communication with the exchange EX. Via this input/output, they exchange data packets with the exchange EX.

It is also possible that the terminals E1 to E3 communicate with the exchange EX by a synchronous transmission method.

Each of the links LE1 to LE3 is formed by two fiber-optic cables, one for each direction.

It is also possible to use only one fiber-optic cable with two channels. These channels could be formed by the use of optical hybrid circuits, by single-frequency duplex operation, or by frequency-division multiplexing, for example.

The links LE1 to LE3 may also be electric lines, and the synchronization method according to the invention may also use all-electrical means.

The exchange EX has optical input/output ports and switches data packets which are sent to it from the terminals E1 to E3.

It is possible to connect further terminals or further exchanges to the exchange EX. Such terminals or exchanges could also use a different synchronization method or switch the data packets by electrical instead of optical means.

The terminals E1 to E3 send data packets over the links LE1, LE2, and LE3, respectively, to the exchange EX, which then switches the data packets and sends them over one of the links LE1 to LE3 to the respective destination terminal, which is one of the terminals E1 to E3. To permit this switching, the terminals E1 to E3 send synchronization signals to the exchange EX, where these synchronization signals are correlated with a synchronization signal containing the clock signal of the exchange EX, and which sends the resulting correlation signals back to the terminals E1, E2, and E3, respectively. By means of these correlation signals, the clocks of the terminals E1, E2, and E3 are then synchronized with the clock of the exchange.

The terminals E1 to E3 are identical in construction. Therefore, only the construction of the terminal E1 will now be described by way of example with the aid of FIG. 2. The internal construction of the exchange EX will be described below with reference to FIGS. 1 and 3.

Figure 2:
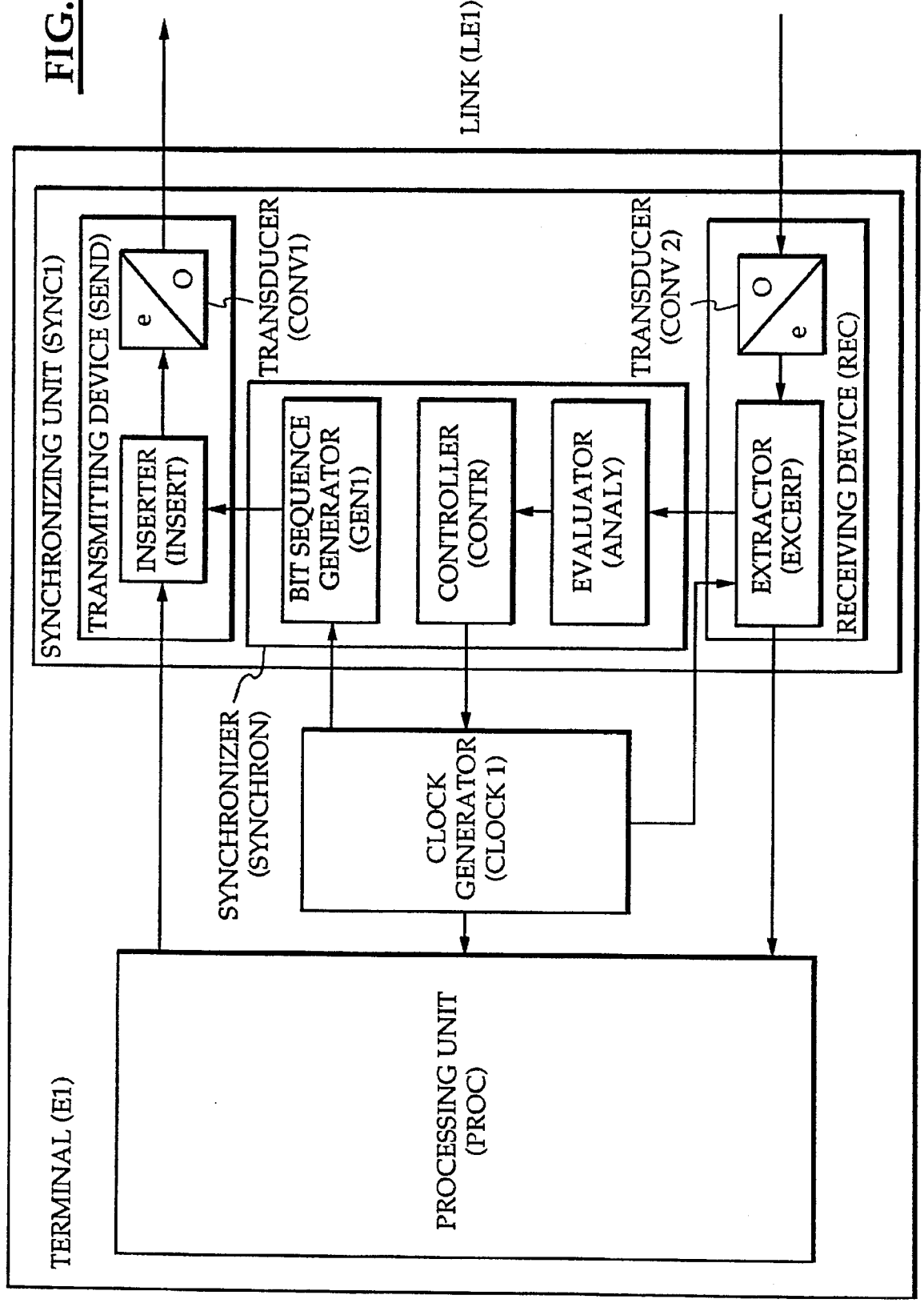
FIG. 2 shows one of the terminals of FIG. 1 with a synchronizing unit according to the invention.

FIG. 2 shows the terminal E1, which transmits data on the link LE1 and receives data from the link LE1. The terminal E1 contains a processing unit PROC, a clock generator CLOCK1, and a synchronizing unit SYNC1 with a transmitting device SEND, a receiving device REC, and a synchronizer SYNCHRON.

The transmitting device SEND, the receiving device REC, the processing unit PROC, and the synchronizer SYNCHRON receive clock signals from the clock generator CLOCK1. The transmitting device SEND receives data packets from the processing unit PROC and transmits data packets on the link LE1. The receiving device REC receives data packets over the link LE1 and sends data packets to the processing unit PROC. The synchronizer SYNCHRON sends data to the transmitting device SEND, receives data from the receiving device REC, and sends control signals to the clock generator CLOCK1.

The processing unit PROC executes the functions of the terminal E1, and communicates with the other terminals E1 and E2 by exchanging data packets. To this end, it sends data packets to the transmitting device SEND at a frame and bit rate determined by the clock generator CLOCK1, and receives data packets from the receiving device REC.

The transmitting device SEND inserts synchronization signals between the data packets, the synchronization signals coming from the synchronizer SYNCHRON. The data stream thus obtained is transmitted on the link LE1.

The receiving device REC separates the correlation signals from the data packets in the data stream received over the link LE1, and passes the correlation signals on to the synchronizer SYNCHRON, and the data packets to the processing unit PROC.

The clock generator CLOCK1 provides the frame- and bit-rate clock for controlling the transmission of the data packets from the processing unit PROC and the transmitting device SEND. It is also possible that the clock generator CLOCK1 provides further or other clock signals or fixes further or other clock relationships.

The synchronizer SYNCHRON sends to the transmitting device SEND synchronization signals containing the frame- and bit-rate clock of the clock generator CLOCK1, and receives from the receiving device REC correlation signals, by means of which it changes the frame- and bit-rate clock of the clock generator CLOCK1.

The transmitting device SEND contains an inserter INSERT and a transducer CONV1.

The inserter INSERT passes the data packets from the processing unit PROC to the transducer CONV1, and receives synchronization signals from the synchronizing unit SYNC1.

The frame-rate clock of the clock generator CLOCK1 is chosen so that there is a guard time between every two data packets received by the inserter INSERT from the processing unit PROC. These time intervals are necessary for clock rates in the Gb/s range, since the exchange EX requires a certain time between two successive data packets to switch the optical components. During the interval corresponding to this guard time, e.g., 5 ns, the exchange EX is not in a position to switch a new data packet.

The inserter INSERT inserts into each of these time intervals a synchronization signal which it receives from the synchronizer SYNCHRON. If the synchronization signal is a digital signal, the inserter INSERT can be implemented with an OR gate. It is also possible to insert a synchronization signal not into each of those time intervals, but into every other time interval, for example.

The transducer CONV1 is an electrical-to-optical transducer, which converts the electrical data stream to an optical data stream.

The receiving device REC contains an extractor EXCERP and a transducer CONV2.

The data stream received over the link LE1 is passed through the transducer CONV2 and the extractor EXCERP to the processing unit PROC. The extractor EXCERP receives clock signals from the clock generator CLOCK1 and sends correlation signals to the synchronizer SYNCHRON.

The transducer CONV2 is an optical-to-electrical transducer and converts the optical data stream received over the link LE1 to an electrical data stream.

The extractor EXCERP extracts the correlation signals from the time intervals between the data packets and passes them on to the synchronizing unit SYNC1. To detect these time intervals, the extractor EXCERP receives the bit- and frame-rate clock from the clock generator CLOCK1.

The transmitting device SEND or the receiving device REC can also be of a different design.

In particular, it is possible to insert and extract the synchronization and correlation signals at a particular point within the data packets rather than in time intervals between the data packets. It would also be possible to separate the transmission of the synchronization signals from that of the data packets and provide separate channels.

Furthermore, it is possible to transmit the data packets from the terminal E1 to the exchange EX1 not in optical form, thus eliminating the need for the transducers CONV1 and CONV2.

The synchronizer SYNCHRON contains a bit sequence generator GEN1, a controller CONTR, and an evaluator ANALY.

The bit sequence generator GEN1 receives clock signals from the clock generator CLOCK1 and sends bit sequences as synchronization signals to the inserter INSERT. The evaluator ANALY receives correlation signals from the extractor EXCERP and transfers data to the controller CONTR. The controller CONTR sends control signals to the clock generator CLOCK1.

The bit sequence generator GEN1 generates a periodic bit sequence containing the bit- and frame-rate clock of the clock generator CLOCK1 and serving as the synchronization signal. The bit sequence is a correlatable sequence, such as a Hadamard code. Such a bit sequence is, for example, 1110010011101000011111000000111. This bit sequence is generated at the bit rate of the clock generator CLOCK1 at a given instant within the frame clock period of the clock generator CLOCK1. This instant is chosen so that the generated bit sequence falls into one of the time intervals between the data packets. The frame-clock and bit-clock information is thus contained in the timing position and in the bit rate of the clock sequence. The bit sequence generator GEN1 can be replaced by a generator which provides an analog synchronization signal instead of a digital synchronization bit sequence.

The evaluator ANALY receives a correlation signal from the extractor EXCERP. With the aid of this correlation signal, the evaluator ANALY determines the offset between the bit- and frame-rate clock of the exchange EX and that of the terminal E1. The evaluator ANALY is, for example, an integrator which integrates over the correlation signal, the resulting value being a measure of the synchronization of those clocks.

By means of the result provided by the evaluator ANALY, the controller CONTR adjusts the bit- and frame-rate clock of the clock generator CLOCK1.

Thus, the inserter INSERT inserts a synchronization bit sequence between every two data packets coming from the processing unit PROC. This synchronization bit sequence is generated by the bit sequence generator GEN1 at the bit and frame rate of the clock generator CLOCK1. The data stream thus obtained is converted from electrical to optical form by the transducer CONV1, which transmits the optical data stream over the link LE1 to the exchange EX. The data stream received from the exchange over the link LE1 is converted from optical to electrical form by the transducer CONV2. After that, the correlation signals, which are representative of the response of the exchange EX to the synchronization bit sequence, are extracted from the time intervals between the data packets by the extractor EXCERP and evaluated by the evaluator ANALY. By means of this evaluation, the bit- and frame-rate clock of the clock generator CLOCK1 is adjusted by the controller CONTR. The data packets are transferred from the extractor EXCERP to the processing unit PROC.

Figure 3:
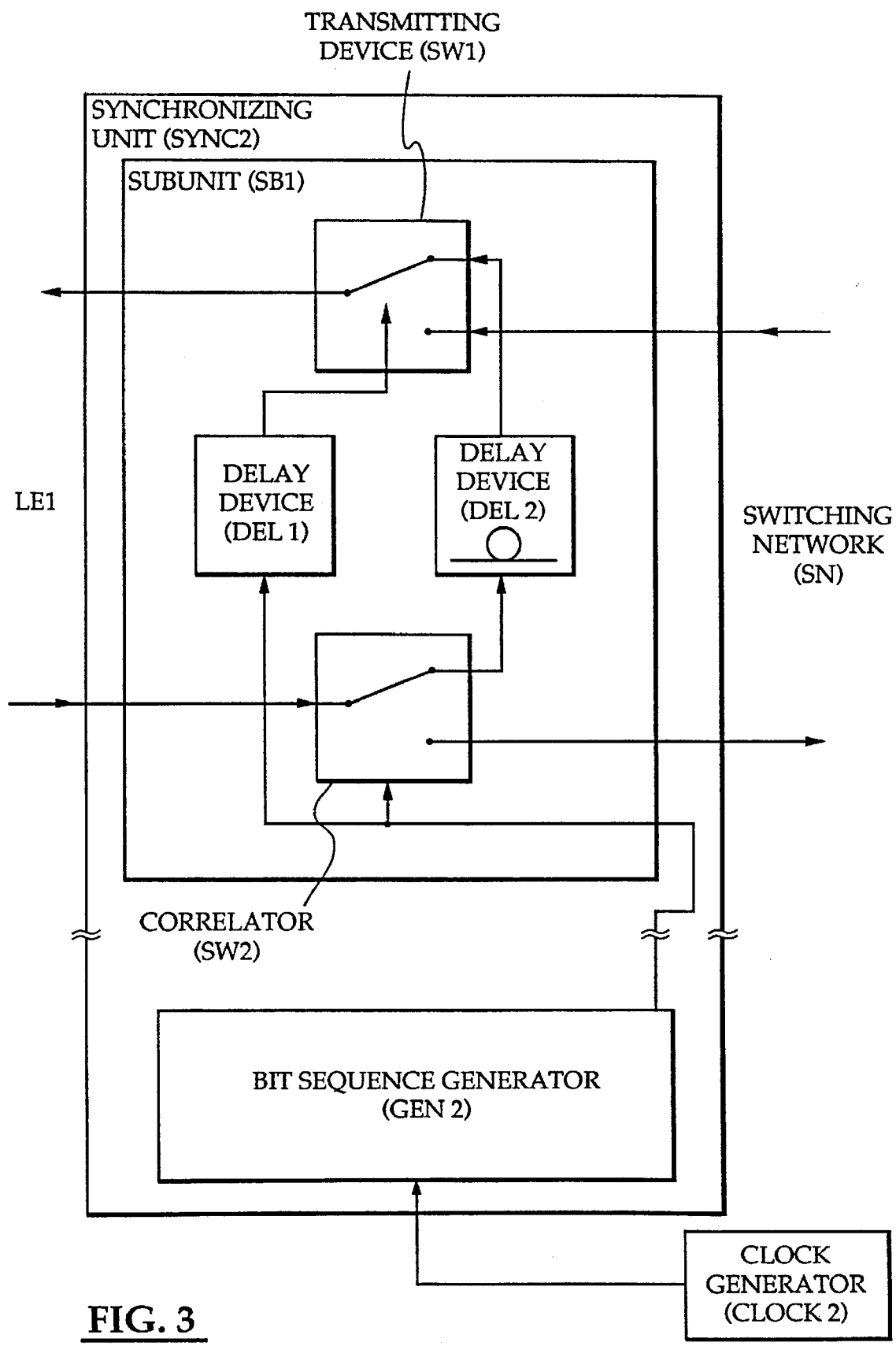
FIG. 3 shows a portion of a synchronizing unit according to the invention for the exchange of FIG. 1.

The structure of the exchange EX is shown in FIGS. 1 and 3.

As shown in FIG. 1, the exchange EX contains the synchronizing unit SYNC2, the clock generator CLOCK2, and the switching network SN. The terminals E1 to E3 are connected via the synchronizing unit SYNC2 to the switching network SN. The synchronizing unit SYNC2 and the switching network SN receive clock signals from the clock generator CLOCK2.

The switching network SN is an all-optical switching network. It switches data packets which are supplied to it in optical form at the bit and frame rate of the clock generator CLOCK2. Because of internal switching times, the frame-rate clock is chosen so that between the data packets there are time intervals in which the internal switching operations can take place.

The clock generator CLOCK2 generates the bit- and frame-rate clock of the exchange EX.

The synchronizing unit SYNC2 synchronizes the bit- and frame-rate clock of the terminals E1 to E3 with the bit- and frame-rate clock of the clock generator CLOCK2.

As a result of this constant synchronization, the data packets from the terminals E1 to E3 arrive at the exchange EX at the correct instant and can be fed immediately, without temporary storage, to the switching network SN. The switching network SN then switches the data packets and sends them to the destination terminals.

The synchronizing unit SYNC2 contains the synchronizing subunits SUB1 to SUB3 and the bit sequence generator GEN2. The bit sequence generator GEN2 sends data to all synchronizing subunits SUB1 to SUB3. The synchronizing subunits SUB1 to SUB3 send data packets to, and receive data packets from, the switching network SN and the terminals E1, E2, and E3, respectively.

The synchronizing subunits SUB1 to SUB3 are identical in construction. The construction of the synchronizing unit SYNC2 will now be explained with reference to FIG. 3.

FIG. 3 shows the clock generator CLOCK2, the bit sequence generator GEN2, and one of the synchronizing subunits, the subunit SUB1. The clock generator CLOCK2 sends clock signals to the bit sequence generator GEN2, which, in turn, sends data to the synchronizing subunit SUB1. The synchronizing subunit SUB1 sends and receives data streams over the link LE1 and over the link to the switching network SN.

The bit sequence generator GEN2 generates periodic bit sequences which serve as synchronization signals. These bit sequences contain the bit- and frame-rate clock fixed by the clock generator CLOCK2.

These bit sequences are recurrent, identical bit sequences which are equal to the bit sequence generated by the bit sequence generator GEN1. As in the case of the bit sequence generator GEN1, the bit and frame clock information is contained in the timing position and the bit rate of such a bit sequence.

The synchronizing subunit SUB1 correlates the synchronization signals contained in the data stream from the terminal E1 with the synchronization signals from the bit sequence generator GEN2, and sends the resulting correlation signals back to the terminal E1.

The synchronizing subunit SUB1 contains a transmitting device SW1 and a correlator SW2 and two delay devices DEL1 and DEL2.

The correlator SW2 receives bit sequences as control instructions from the bit sequence generator GEN2, and the transmitting device SW1 receives bit sequences as control instructions from the bit sequence generator GEM2 via the delay device DEL1. The transmitting device SW1 receives data streams from the switching network SN and sends data streams over the link LE1. The correlator SW2 receives data streams over the link LE1 and sends data streams to the switching network SN. It sends data to the transmitting device SW1 through the delay device DEL2.

The transmitting device SW1 and correlator SW2 are formed by an optical switch which is controlled electrically. The transmitting device SW1 has two optical inputs and one optical output, and the correlator SW2 has one optical input and two optical outputs. By means of an electric control signal, a path can be switched between one of the inputs and the output in the case of SW1 and between the input and one of the outputs in the case of SW2. Both SW1 and SW2 are thus formed by an integrated optical directional coupler as is described in PCT Application WO 91/15907.

The delay device DEL2 delays an optical data stream coming from correlator SW2 and passes it on to transmitting device SW1. The delay is chosen so that a correlation bit sequence generated with the correlator SW2 is inserted precisely into the time interval between the data packets sent by the switch over the link LE1. The delay device DEL2 is implemented, for example, with a fiber delay loop and possibly an optical amplifier for attenuation equalization.

The delay device DEL1 delays the bit sequence from the bit sequence generator GEN2 by the same time interval as the delay device DEL2. Since the signals to be delayed by the delay device DEL1 are electric signals, the delay device DEL2 is implemented, for example, with a shift register.

An optical data stream consisting of a sequence of data packets and synchronization bit sequences inserted therebetween arrives at the input of the correlator SW2. The correlator SW2 is controlled by the bit sequences generated in the bit sequence generator GEN2. Such a bit sequence is transmitted by the bit sequence generator GEN2 at the bit rate of the clock generator CLOCK2 once within the frame clock period of the clock generator CLOCK2. If the bit- and frame-rate clock of the terminal E1 and that of the exchange EX are in synchronism, these bit sequences will coincide with the synchronization bit sequences between the data packets. During the remaining time, the correlator SW2 is controlled by a 0 . . . 0 bit sequence from the bit sequence generator GEN2 so that the incoming data stream is transferred to the switching network SN. As the correlator SW2 is switched in accordance with the bit sequence from the bit sequence generator GEN2, the synchronization bit sequence coming from the terminal E1 and the synchronization bit sequence generated by the bit sequence generator GEN2 are correlated. If, for example, an optical 1 and an electrical 1 coincide, an optical 1 will be sent to the delay device DEL2. All other combinations result in an optical 0 or, in case of a small phase difference, in a narrower optical 1 at the input of the delay device DEL2. The correlation bit sequence thus generated is delayed in the delay device DEL2 until it can be inserted precisely into the time interval between the data packets addressed to the terminal E1.

The transmitting device SW1 receives, besides the data from the delay device DEL2, an optical data stream consisting of a sequence of data packets and free time intervals between the data packets. The transmitting device SW1 is controlled by the bit sequences from the bit sequence generator GEN2 which were delayed in the delay device DEL1 by a time interval equal to the delay provided by the delay device DEL2, so that the transmitting device SW1 transfers the data packets from the switching network SN to the terminal E1 and inserts the delayed correlation bit sequence into the time intervals between the data packets. Thus, if an electrical 0 is applied to the transmitting device SW1, the data stream from the switching network SN will be transmitted on the link LE1; if an electrical 1 is applied, the correlation bit sequence from the delay device DEL2 will be transmitted.

It is also possible that the bit sequence generator GEN2 sends bit sequences to the transmitting device SW1 which are different from those sent to the correlator SW2. For example, the bit sequence generator GEN2 could send to the transmitting device SW1 a 1 . . . 1 bit sequence for the duration of a correlation bit sequence and a 0 . . . 0 bit sequence during the remaining time. Thus, the correlation bit sequence would also be inserted between the data packets with the transmitting device SW1.

It is further possible to replace the transmitting device SW1 or correlator SW2 by an optical directional coupler which couples the synchronization or correlation signal out of or into the link LE1. If the correlator SW2 were replaced by such an optical directional coupler, an additional correlator controlled by the bit sequence of the bit sequence generator GEN2 would be required. It is also possible that such a correlator generates an analog correlation signal from two analog synchronization signals if analog synchronization and correlation signals are used in place of digital ones.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method of synchronizing at least a first clock signal of a first station (E1 to E3) with at least a second clock signal of a second station (EX), comprising the steps of sending a first synchronization signal containing the first clock signal from the first station (E1 to E3) to the second station (EX) and correlating the first synchronization signal in the second station (EX) with a second synchronization signal containing the second clock signal to obtain a correlation signal, wherein the correlation signal is sent from the second station (EX) back to the first station (E1 to E3) in response to the transmission of the first synchronization signal, wherein the correlation signal is evaluated in the first station (E1 to E3), and wherein the result of said evaluation is used to adjust the first clock signal of the first station (E1 to E3), wherein the first and second synchronization signals are formed by a first synchronization bit sequence and second synchronization bit sequence, respectively, and wherein the two synchronization bit sequences are correlated by passing the first synchronization bit sequence through a switching device (SUB1 to SUB3) controlled by the second synchronization bit sequence, said switching device generating a correlation bit sequence and sending it back to the first station (E1 to E3).

2. A method as claimed in claim 1, wherein a first bit- and frame-rate clock of the first station (E1 to E3) is synchronized with a second bit- and frame-rate clock of the second station (EX).

3. A method as claimed in claim 2, wherein the first station (E1 to E3) sends first data packets to the second station (EX) at the first bit clock rate and at the first frame clock rate, and wherein a first synchronization bit sequence is sent from the first station (E1 to E3) to the second station (EX) between a first sequence of data packets.

4. A method as claimed in claim 2, wherein the second station (EX) sends second data packets to the first station (E1 to E3), and wherein a correlation bit sequence is delayed by a constant time interval which is chosen so that when the clock signals are in synchronism, the correlation bit sequence is sent from the second station (EX) to the first station (E1 to E3) between the second data packets.

5. A method as claimed in claim 1 wherein the first station (E1 to E3) sends a first sequence of data packets to the second station (EX) at the first bit clock rate and at the first frame clock rate, and wherein the first synchronization bit sequence is sent from the first station (E1 to E3) to the second station (EX) between the first sequence of data packets.

6. A method as claimed in claim 1, wherein the second station (EX) sends second data packets to the first station (E1 to E3), and wherein the correlation bit sequence is delayed by a constant time interval which is chosen so that when the clock signals are in synchronism, the correlation bit sequence is sent from the second station (EX) to the first station (E1 to E3) between the second data packets.

7. A synchronizing unit (SYNC2) for a second station (EX), for synchronizing at least a first clock signal of a first station (E1 to E3) with at least a second clock signal of the second station (EX), comprising a generator (GEN2) for generating a second synchronization signal containing the second clock signal and a correlator (SW2) for correlating the second synchronization signal with a first synchronization signal containing the first clock signal, wherein the synchronizing unit (SYNC2) is provided with a transmitting device (SW1) which is adapted to receive from the correlator (SW2) a correlation signal corresponding to the result of the correlation of the first and second synchronization signals, and transmitting the correlating signal to the first station (E1), wherein the first synchronization signal and the correlation signal are optical signals, and wherein the correlator (SW2) and the transmitting device (SW1) each contain an optical switch controlled by the second synchronization signal.

* * * * *

UNITED STATES PATENT AND TRADEMARK OFFICE
CERTIFICATE OF CORRECTION

PATENT NO. : 5,654,815
DATED : August 5, 1997
INVENTOR(S) : S. Bunse

It is certified that error appears in the above-identified patent and that said Letters Patent is hereby corrected as shown below:

At column 10, line 42 (claim 6, line 3), please cancel "the" prior to "correlation" and substitute --a-- therefor.

Signed and Sealed this

Twenty-fifth Day of November, 1997

Attest:

BRUCE LEHMAN

Attesting Officer

Commissioner of Patents and Trademarks